United States Patent
Kezys (10) Patent No.: US 8,619,715 B2
(45) Date of Patent: *Dec. 31, 2013

(54) GLOBAL VIRTUAL LOCAL AREA NETWORK FOR VOICE COMMUNICATION SESSIONS IN A WIRELESS LOCAL AREA NETWORK

(75) Inventor: Vytautas Robertas Kezys, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 129 days.

This patent is subject to a terminal disclaimer.

(21) Appl. No.: 13/426,143

(22) Filed: Mar. 21, 2012

(65) Prior Publication Data

US 2012/0177008 A1    Jul. 12, 2012

Related U.S. Application Data

(63) Continuation of application No. 11/615,284, filed on Dec. 22, 2006, now Pat. No. 8,194,605.

(51) Int. Cl.
*H04W 4/00* (2009.01)

(52) U.S. Cl.
USPC ........... 370/331; 370/328; 370/329; 370/330; 370/338

(58) Field of Classification Search
None
See application file for complete search history.

(56) References Cited

U.S. PATENT DOCUMENTS

| | | | |
|---|---|---|---|
| 2004/0165600 A1* | 8/2004 | Lee | 370/395.53 |
| 2004/0176024 A1 | 9/2004 | Hsu et al. | |
| 2004/0184422 A1* | 9/2004 | Shaheen | 370/331 |
| 2004/0185845 A1 | 9/2004 | Abhishek et al. | |
| 2004/0266427 A1* | 12/2004 | Kurokawa | 455/426.2 |
| 2005/0089010 A1* | 4/2005 | Rue et al. | 370/349 |
| 2005/0180367 A1* | 8/2005 | Dooley et al. | 370/338 |
| 2005/0288021 A1 | 12/2005 | Hunkeler | |
| 2008/0002607 A1* | 1/2008 | Nagarajan et al. | 370/328 |
| 2008/0008143 A1* | 1/2008 | Robertson et al. | 370/338 |
| 2008/0069065 A1* | 3/2008 | Wu et al. | 370/340 |
| 2008/0148359 A1 | 6/2008 | Kezys et al. | |
| 2008/0181184 A1 | 7/2008 | Kezys | |
| 2008/0182565 A1 | 7/2008 | Lazaridis et al. | |
| 2008/0273506 A1 | 11/2008 | Kezys | |

* cited by examiner

*Primary Examiner* — Jae Y Lee
(74) *Attorney, Agent, or Firm* — Integral Intellectual Property Inc.; Miriam Paton (57) ABSTRACT

A communication network has a first wireless access point (AP) in a first subnet segment and a second wireless AP in a second subnet segment, and provides a virtual local area network (VLAN) which spans the first and the second subnet segments. A mobile device associates with the first wireless AP using a first extended set service identifier (ESSID). In response to identifying a request to establish a communication session, the mobile device reassociates with the first wireless AP using a second ESSID, for accessing the VLAN to establish and maintain the communication session.

17 Claims, 4 Drawing Sheets

GLOBAL VIRTUAL LOCAL AREA NETWORK FOR VOICE COMMUNICATION SESSIONS IN A WIRELESS LOCAL AREA NETWORK

CROSS-REFERENCE TO RELATED APPLICATION

This patent application is a continuation of and claims priority to U.S. non-provisional patent application having application Ser. No. 11/615,284 and filing date of 22 Dec. 2006, now U.S. Pat. No. 8,194,605, which is hereby incorporated by reference herein.

BACKGROUND

1. Field of the Technology

The present disclosure relates generally to voice communication sessions in a computer network which includes a wireless local area network (WLAN), and more particularly to the use of a global virtual local area network (VLAN) in the computer network for voice communication sessions to avoid IP address reassignment for inter-subnet handoffs for mobile communication devices.

2. Description of the Related Art

In wireless communication networks, such as wireless local area networks (WLANs) which operate in accordance with 802.11-based standards, one or more network identifiers may be utilized by mobile communication devices to identify a WLAN to connect with and obtain communication services. One of these services may be a voice telephony service, such as the voice telephony service based on Voice over IP (VoIP) communications via the WLAN. For 802.11-based WLANs, network coverage is provided by a plurality of wireless access points (APs) and the network identifiers are referred to as extended service set identifiers (ESSIDs).

During a VoIP communication session, the mobile device may move from a radio frequency (RF) coverage area of one wireless AP to the RF coverage area of another wireless AP. If this happens, the VoIP session of the mobile device is "handed-over" to the other wireless AP. During a handoff, the mobile device associates with the new wireless AP with use of an ESSID so that the VoIP traffic may be exchanged between the new wireless AP and the mobile device ("layer-2 roaming" transition). Such a transition is mostly transparent to the end user of the mobile device and provides for minimal if any disruption of the VoIP session. However, the new wireless AP may be part of an IP subnet segment of the WLAN that is different from that of the previous wireless AP. If the mobile device is handed-off to a wireless access point in a different subnet segment, a new IP address of the subnet segment must be dynamically assigned to the mobile device by the network. Thus, a "layer-3 roaming" transition must take place in this situation. Unfortunately, the layer-3 roaming transition during the VoIP session may be disruptive of the VoIP session.

Accordingly, there is a need for communication methods and apparatus which overcome the deficiencies of traditional techniques.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

A computer network which includes a wireless local area network (WLAN) has at least first and second subnet segments and a router coupled between the first and the second subnet segments. The first subnet segment has a first IP subnet address range and the second subnet segment has a second IP subnet address range different from the first IP subnet address range. At least a first wireless access point in the first subnet segment has both a local extended service set identifier (ESSID) and a global ESSID for mobile communication devices to associate with it. Similarly, at least a second wireless access point in the second subnet segment has both a local ESSID and the global ESSID for mobile communication devices to associate with it. The global ESSID is used for accessing a global virtual local area network (VLAN) which spans the entire network including the first and the second subnet segments. Initially, a mobile communication device associates with the first wireless access point using the local ESSID. For a Voice over IP (VoIP) session which may involve an inter-subnet handoff, the mobile device reassociates with the first wireless access point using the global ESSID of the global VLAN just before the VoIP session or call is established. Thus, the VoIP session is established and maintained for the mobile device in the global VLAN. If a handoff to the second wireless access point in the second subnet segment is made during the VoIP session, the mobile device associates with the second wireless access point also using the global ESSID of the global VLAN. After termination of the VoIP session, the mobile device associates with the first or the second wireless access point using the local ESSID. Advantageously, no IP address reassignments for inter-subnet handoffs are necessary during VoIP sessions, which improves the timeliness and reliability of such handoffs.

Figure 1:
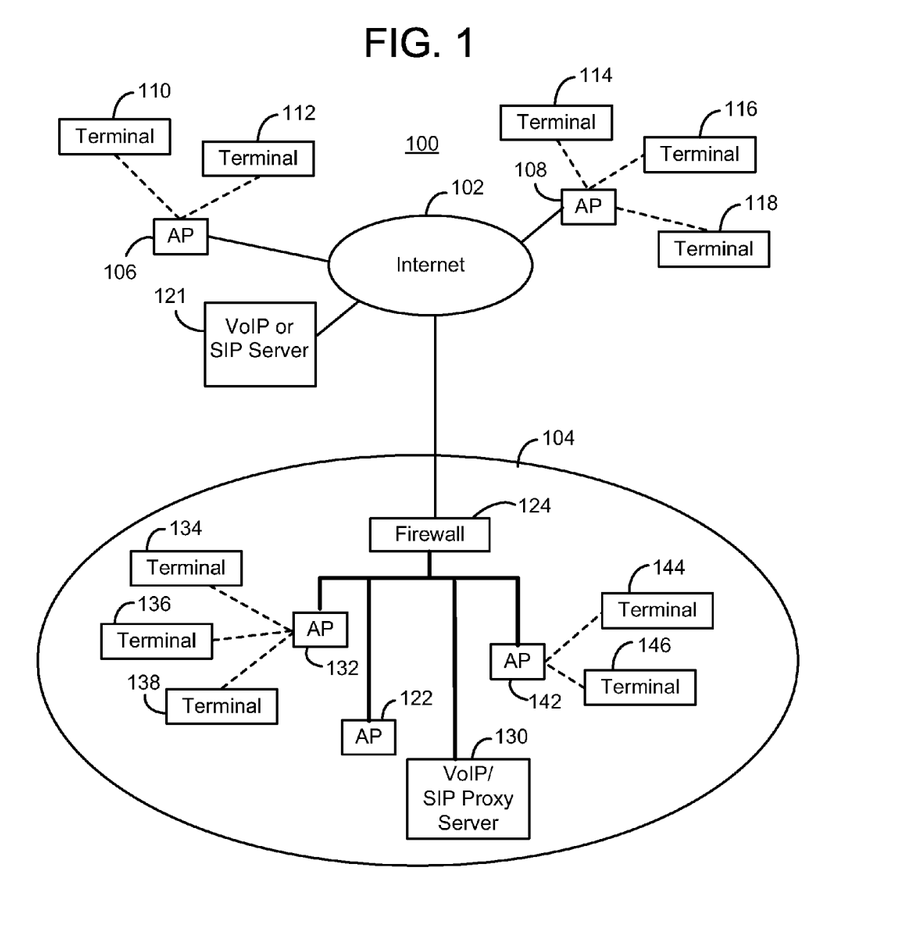
FIG. 1 is a block diagram which illustrates a communication system which includes one or more communication networks having one or more wireless local area networks (WLANs)

To illustrate general network architecture, FIG. 1 is a block diagram which shows a communication system 100 which includes a public network 102 (e.g. the Internet) and a private network 104. In the present embodiment, private network 104 is or includes a wireless local area network (WLAN). In the WLAN, terminals may associate to their networks through access points (APs) as shown. Preferably, at least some of the APs are wireless APs of the WLAN and at least some of the terminals are mobile/wireless communication devices which interface and connect through these wireless APs. Such terminals and APs may operate in accordance with well-known IEEE 802.11 standards. The terminals shown in public network 102 include terminals 110 and 112 which have interfaced with AP 106, and terminals 114, 116, and 118 which have interfaced with AP 108. The terminals shown in private network 104 include terminals 134, 136, 138 which have interfaced with AP 132, and terminals 144 and 146 which have interfaced with AP 142.

Private network 104 which includes the WLAN provides various data and communication services to its terminals. For example, private network 104 may provide for voice telephony communication services for its terminals with use of Voice over IP (VoIP) communications. For these types of services, private network 104 may utilize a VoIP server architecture for VoIP communication sessions and/or an e-mail server architecture for e-mail message communications, as examples. For these purposes, communication system 100 may also include a VoIP or Session Initiation Protocol (SIP) server. In the present embodiment, communication system 100 has a VoIP or SIP server 121 in public network 102, and a VoIP or SIP server 130 in private network 104. Note that some communication applications utilized by terminals, such VoIP applications, require the use of SIP. SIP is well-documented in standard documents such as Request For Comments (RFC) 3261. A firewall 124 may be provided in private network 104 for preventing unauthorized access from users in public network 102.

Figure 2:
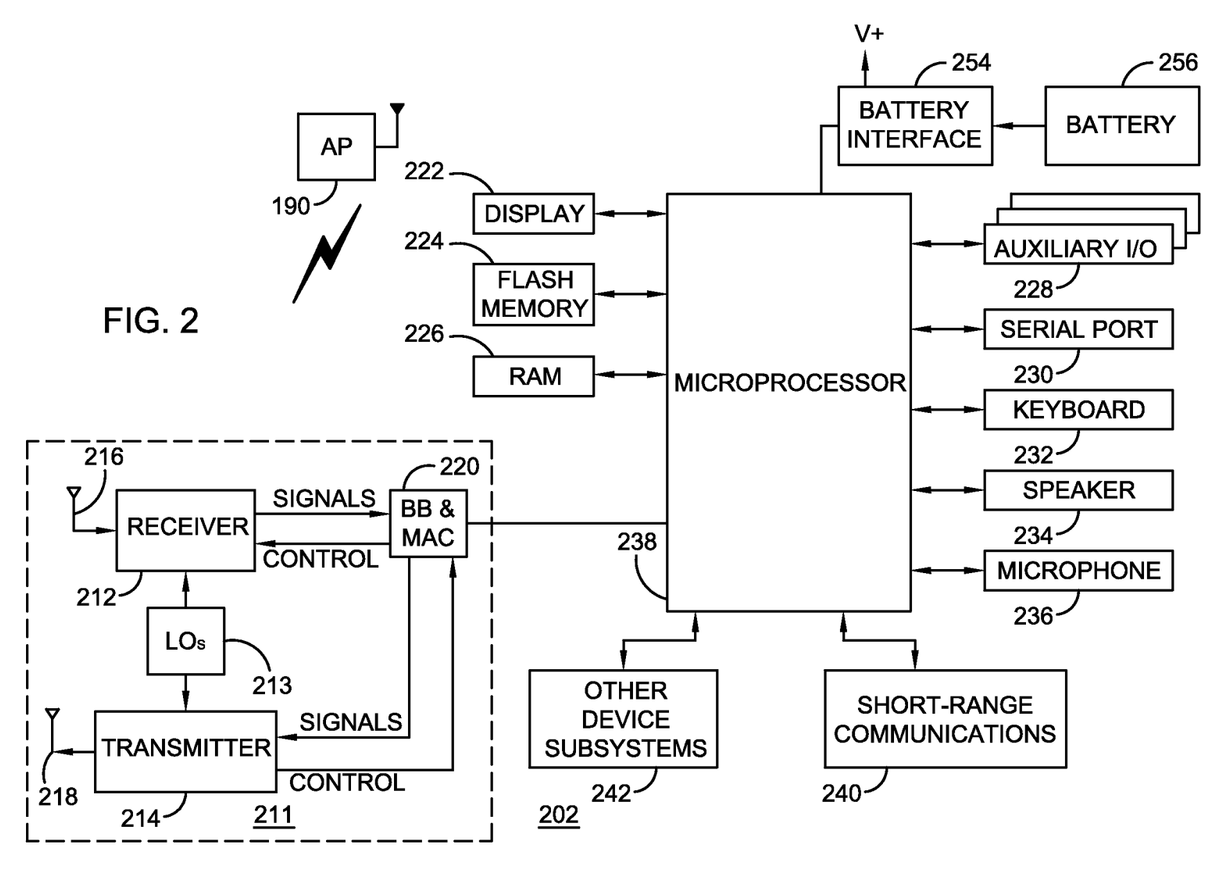
FIG. 2 is a more detailed schematic diagram of a mobile communication device which may operate in a WLAN of FIG. 1, namely, a mobile station of the preferred embodiment.

Referring now to FIG. 2, electrical components of a typical mobile communication device 202 (e.g. a mobile station) which operates with wireless APs of communication system 100 of FIG. 1 will be described. Mobile device 202 may be representative of one or more terminals shown and described in relation to FIG. 1. Mobile device 202 is preferably a two-way communication device having at least voice and advanced data communication capabilities, including the capability to communicate with other computer systems. Also preferably, mobile device 202 is a wireless communication device which operates in accordance with an IEEE 802.11 standards. Depending on the functionality provided by mobile device 202, it may be referred to as a data messaging device, a two-way pager, a cellular-type telephone with data messaging capabilities, a wireless Internet appliance, or a data communication device (with or without telephony capabilities).

As shown in FIG. 2, mobile device 202 is adapted to wirelessly communicate with AP 190 which may be a wireless AP of the present disclosure. For communication with AP 190, mobile device 202 utilizes communication subsystem 211. Depending on the type of device, mobile device 202 may also be adapted to wirelessly communicate with other systems such as cellular telecommunication systems. With such configuration, mobile device 202 may be referred to as a "dual mode" mobile device. Although mobile device 202 may have separate and independent subsystems for these purposes, at least some portions or components of these otherwise different subsystems may be shared where possible. Note, however, that the provisioning techniques of the present disclosure do not require that mobile device 202 be any type of dual mode device.

Communication subsystem 211 includes a receiver 212, a transmitter 214, and associated components, such as one or more (preferably embedded or internal) antenna elements 216 and 218, local oscillators (LOs) 213, and a processing module such as a baseband (BB) and media access control (MAC) processing module 220. As will be apparent to those skilled in the field of communications, the particular design of communication subsystem 211 depends on the communication network in which mobile device 202 is intended to operate. In the present disclosure, communication subsystem 211 (including its associated processor/processing components) are operative in accordance with IEEE 802.11 standards.

Mobile device 202 may send and receive communication signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in BB/MAC processing module 220. In a similar manner, signals to be transmitted are processed, including modulation and encoding, for example, by BB/MAC processing module 220. These processed signals are input to transmitter 214 for digital-to-analog (D/A) conversion, frequency up conversion, filtering, amplification and transmission through the network via antenna 218. BB/MAC processing module 220 not only processes communication signals, but may also provide for receiver and transmitter control. Note that receiver 212 and transmitter 214 may share one or more antennas through an antenna switch (not shown in FIG. 2), instead of having two separate dedicated antennas 216 and 218 as shown.

Since mobile device 202 may be a portable battery-powered device, it also includes a battery interface 254 for receiving one or more rechargeable batteries 256. Such a battery 256 provides electrical power to most if not all electrical circuitry in mobile device 202, and battery interface 254 provides for a mechanical and electrical connection for it. Battery interface 254 is coupled to a regulator (not shown in FIG. 2) that provides a regulated voltage V to all of the circuitry.

Mobile device 202 includes a microprocessor 238 (one type of processor or controller) that controls overall operation of mobile device 202. This control includes the communication techniques of the present disclosure. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile device 202. A predetermined set of applications that control basic device operations, including at least data and voice communication applications, will normally be installed on mobile device 202 during its manufacture. A preferred application that may be loaded onto mobile device 202 may be a personal information manager (PIM) application having the ability to organize and manage data items relating to user such as, but not limited to, e-mail, calendar events, voice mails, appointments, and task items.

The PIM application preferably has the ability to send and receive data items via the wireless network. In a preferred embodiment, PIM data items are seamlessly integrated, synchronized, and updated via the wireless network, with the wireless device user's corresponding data items stored and/or associated with a host computer system thereby creating a mirrored host computer on mobile device 202 with respect to such items. This is especially advantageous where the host computer system is the wireless device user's office computer system. Additional applications may also be loaded onto mobile device 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile device 202 and may provide enhanced on-device functions, communication-related functions, or both. For example, secure communication applications may enable electronic commerce functions and other such financial transactions to be performed using mobile device 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile device 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications (e.g. involving the use of VoIP or SIP server 121 of FIG. 1), the overall operation of mobile device 202 is substantially similar, except that the received signals would be output to speaker 234 and signals for transmission would be generated by microphone 236. Alternative voice or audio I/O subsystems, such as a voice message recording subsystem, may also be implemented on mobile device 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 202 by providing for information or software downloads to mobile device 202 other than through a wireless communication network. The alternate download path may, for example, be used to load an encryption key onto mobile device 202 through a direct and thus reliable and trusted connection to thereby provide secure device communication. Short-range communications subsystem 240 of FIG. 2 is an additional optional component that provides for communication between mobile device 202 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Although a specific mobile device 202 has just been described, any suitable mobile communication device or terminal may be part of the inventive methods and apparatus which will be described in fuller detail below. Note that many components of mobile device 202 shown and described may not be included (e.g. a full QWERTY keypad may be optional).

Figure 3:
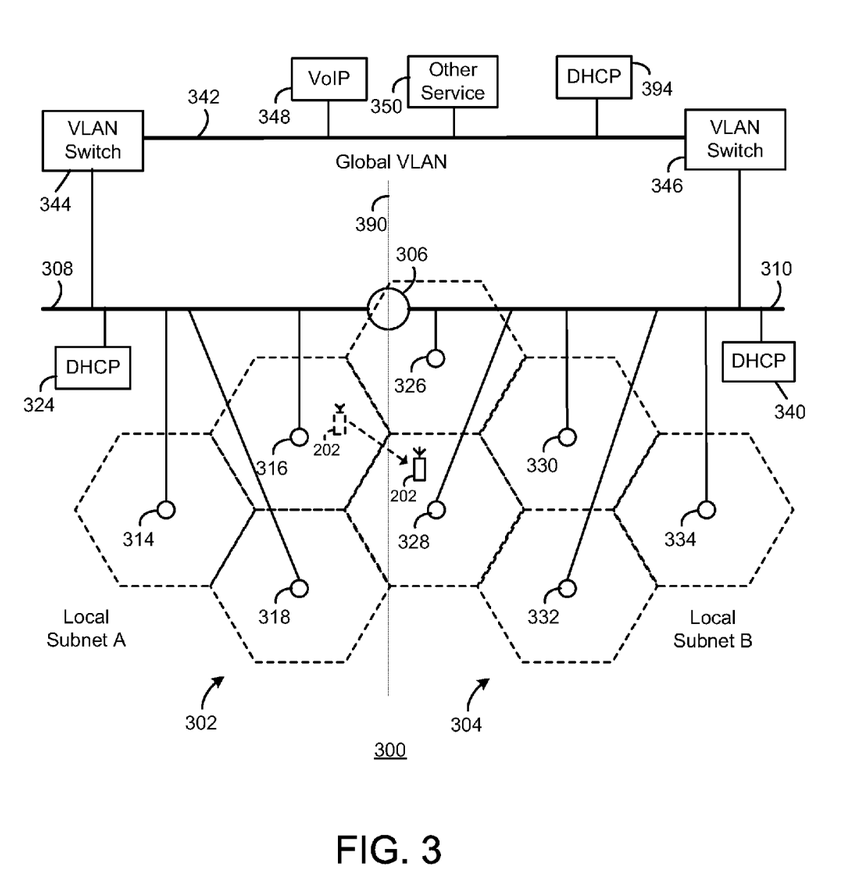
FIG. 3 is a computer network having a WLAN and including at least a first subnet segment and a second subnet segment separated by a router, as well as a global virtual local area network (VLAN) that a mobile communication device may utilize for Voice over IP (VoIP) communication sessions to avoid IP address reassignment for inter-subnet handoffs.

FIG. 3 is an illustration of a computer network 300 of the present disclosure. Computer network 300 is partitioned into at least two subnet segments including a first subnet segment 308 and a second subnet segment 310 which are separated by a router 306. A dotted line 390 is shown in FIG. 3 to better distinguish between the two different segments 308 and 310. First subnet segment 308 has a first subnet address range and second subnet segment 310 has a second subnet address range different from the first subnet address range. Computer network 300 also has a WLAN which includes a plurality of wireless access points (APs) 302 in first subnet segment 308 and a plurality of wireless access points (APs) 304 in second subnet segment 310. In this embodiment, the plurality of wireless access points 302 in first subnet segment 308 include wireless access points 314, 316, and 318, and the plurality of wireless access points 304 in second subnet segment 310 include wireless access points 328, 330, 332, and 334. Separate subnet segments 308 and 310 provide for scalability within computer network 300 and reduced broadcast traffic within each segment.

To begin operation in the WLAN, a mobile device will normally associate with one of the wireless access points using an extended service set identifier (ESSID). In the present embodiment, the mobile device normally associates with one of wireless access points 302 in first subnet segment 308 with use of a local ESSID. Similarly, the mobile device normally associates with one of wireless access points 304 in second subnet segment 310 with use of a local ESSID. The local ESSID used for wireless access point 302 in first subnet segment 308 may be the same local ESSID used for wireless access point 304 in second subnet segment 310; alternatively, these local ESSIDs are different from each other. After associating with the appropriate wireless access point, an authentication procedure may take place between computer network 300 and the mobile device. After successful authentication, an IP address may be dynamically assigned to the mobile device through use of an address assigning mechanism in computer network 300. This address assigning mechanism may be, for example, a dynamic host configuration protocol (DHCP) server 324 or 340. Thereafter, the mobile device may access one or more services provided by computer network 300. One service that computer network 300 may provide for its mobile devices is a Voice over IP (VoIP) communication service.

As shown in FIG. 3, each wireless access point has a radio frequency (RF) coverage area (each shown as a dashed hexagon) within which a mobile device may communicate with the wireless access point. Some of these RF coverage areas are adjacent to others. For example, the RF coverage area of wireless access point 314 in first subnet segment 308 is adjacent the RF coverage area of wireless access point 316 in first subnet segment 308. During a VoIP communication session, when the mobile device is moved from the RF coverage area of wireless access point 314 to the RF coverage area of wireless access point 316, the VoIP session of the mobile device is "handed-over" to wireless access point 316. Conventionally, the mobile device associates with the new wireless access point 316 with use of the local ESSID so that VoIP traffic may be exchanged between wireless access point 316 and the mobile device. This transition may be referred to as a "layer-2 roaming" transition, which is mostly transparent to the end user of the mobile device and provides for minimal disruption of the VoIP session. Since the mobile device remains within the same subnet, the dynamically assigned IP address of the mobile device need not change.

However, other adjacent RF coverage areas of wireless access points may be connected in a different subnet segment. For example, the RF coverage area of wireless access point 316 in first subnet segment 308 is adjacent the RF coverage area of wireless access point 328 in second subnet segment 310. During a VoIP session, when mobile device 202 is moved from the RF coverage area of wireless access point 316 to the RF coverage area of wireless access point 328, the VoIP session of mobile device 202 is "handed-over" to wireless access point 328. Conventionally, mobile device 202 associates with the new wireless access point 328 with use of the local ESSID so that VoIP traffic may be exchanged between wireless access point 328 and mobile device 202. Conventionally, since mobile device 202 switches to a new subnet (i.e. second subnet segment 310), a new IP address must be dynamically assigned to mobile device 202 by DHCP server 340. Thus, a "layer-3 roaming" transition must take place. Once a new IP address is assigned, the entities involved in the VoIP session need to be updated with the new IP address. As apparent, the reassignment of an IP address for mobile device 202 and the layer-3 roaming transition during the VoIP session may be disruptive of the VoIP session.

In accordance with the present disclosure, each wireless access point 302 in first subnet segment 308 and each wireless access point 304 in second subnet segment 310 are adapted to make use of a global ESSID for accessing a global virtual local area network (VLAN) for at least some VoIP communication sessions. The global VLAN spans across the entire computer network 300 which includes first and second subnet segments 308 and 310. The global ESSID is different from the local ESSIDs. Thus, each wireless access point utilizes both a global ESSID and one or more local ESSIDs that are different from the global ESSID. In the global VLAN, VoIP sessions may be made available through use of a VoIP server or architecture 348 of the global VLAN. An address assigning mechanism, such as a DHCP server 394, is provided for and in the global VLAN so that mobile devices may be assigned a new IP address upon switching to the global VLAN. Other services may also be made available in the global VLAN through use of one or more other application servers 350. VLAN switches 344 and 346 are utilized in computer network 300 to help create the global VLAN; if mobile device 202 associates with a wireless access point with use of the global ESSID, one of VLAN switches 344 and 346 permits mobile device 202 to access services of the global VLAN.

Advantageously, mobile devices make use of the global VLAN to reduce disruption of VoIP sessions caused by layer-3 roaming transitions. Effectively, use of the global VLAN for a VoIP session eliminates the need for any layer-3 roaming transition to take place during the VoIP session. Prior to any VoIP session, the mobile device remains associated with one of wireless access points 314, 316, and 318 of first subnet segment 308 (e.g. wireless access point 316) with use of the local ESSID. Just prior to or during the initiation of a VoIP session, but prior to the voice media streams being established, however, mobile device 202 causes a reassociation to be made between it and wireless access point 316 with use of the global ESSID of the global VLAN. After the reassociation with the global ESSID of the global VLAN, the mobile device is reassigned with a new IP address from DHCP server 394 of the global VLAN. The VoIP session is thereafter established and maintained in the WLAN with use of VoIP server 348. The VoIP session is maintained for the mobile device using the newly-assigned IP address. When mobile device 202 is moved from the RF coverage area of wireless access point 316 to the RF coverage area of wireless access point 328, the VoIP session of mobile device 202 is "handed-over" to wireless access point 328. If a handoff to one of wireless access points of second subnet segment 310 is needed during the VoIP session, mobile device 202 associates with wireless access point 328 with use of the global ESSID in a simple "layer-2 roaming" transition.

Although mobile device 202 moves within a new subnet region (i.e. second subnet segment 310), a new IP address need not (yet) be dynamically assigned to mobile device 202 by DHCP server 340, as mobile device 202 is operating in the global VLAN. Thus, a "layer-3 roaming" transition need not take place during the VoIP session. If mobile device 202 needs to be handed-off further during the VoIP session to another wireless access point of second subnet segment 310 (e.g. wireless access point 332), it associates with wireless access point 332 with use of the same global ESSID. Similarly, any further AP associations make use of the global ESSID throughout computer network 300 during the VoIP session. As apparent, the VoIP session is not disrupted by any layer-3 roaming transition.

When the VoIP session is terminated, the mobile device reassociates with the current wireless access point using the local ESSID corresponding to the current subnet segment. Since mobile device 202 has associated with a wireless access point of a new subnet (i.e. second subnet segment 310), a new IP address will then be dynamically assigned to mobile device 202 by DHCP server 340 and used for subsequent communications with mobile device 202. Communication and servers may be utilized via the local subnet as was prior to the VoIP session.

In a variation of this technique, mobile device 202 utilizes the global ESSID and global VLAN for a VoIP session only if it receives an indication that the VoIP session is likely to involve an inter-subnet hand-off; otherwise, it utilizes the local ESSID for the VoIP session. This indication may be provided with use of any one of a number of techniques or combination thereof. For example, an association with one or more of the wireless access points 326 and 328 along the subnet boundary may be used to provide the indication if mobile device 202 is likely to have an inter-subnet hand-off. Specifically, if a VoIP session is being initiated or established for mobile device 202 while it is associated with a wireless access point that is near the subnet border (e.g. wireless access point 326), then this indication will cause mobile device 202 to reassociate with the wireless access point using the global ESSID prior to establishing the VoIP session. However, if the VoIP session is being initiated or established for mobile device 202 while it is associated with a wireless access point that is further from the subnet border (e.g. wireless access point 314), then mobile device 202 will refrain from such reassociation and instead remain associated with the wireless access point using the local ESSID during the VoIP session. Other possible indication techniques exist, such as identifying a user input signal at a user interface of the mobile device (i.e. manual user indication) or identifying a likelihood of an inter-subnet call handoff based on historical call mobility data.

The VoIP session or call may be initiated by mobile device 202 (i.e. an outgoing call from mobile device 202) or from a calling terminal (i.e. an incoming call to mobile device 202). When the VoIP session is initiated by mobile device 202, mobile device 202 detects a call request being made through its user interface. The detection of the call request causes mobile device 202 to automatically (i.e. without user control or intervention) switch over to the global VLAN and be assigned with a new IP address from DHCP server 394. Prior to initiating the procedures to establish the VoIP session, mobile device 202 sends the newly-assigned IP address to VoIP/SIP server 348 and other network entities as needed for use during communications for the VoIP session. On the other hand, for an incoming call, VoIP/SIP server 348 which serves as a proxy will receive an INVITE message from the calling terminal on behalf of mobile device 202 and forward the message to mobile device 202. Mobile device 202 receives and detects this message and, in response, automatically (i.e. without user control or intervention) switches over to the global VLAN and receives the newly-assigned IP address from DHCP server 394. Subsequently, mobile device 202 sends a REINVITE message to VoIP/SIP server 348 along with the newly-assigned IP address. The call is subsequently answered for the VoIP session to commence with the newly-assigned IP address being used for communications.

Although it has been described that computer network 300 employs a single global VLAN, computer network 300 may in practice employ multiple VLANs for various purposes depending on the network requirements (e.g. call capacity scaling), where each separate VLAN is associated with at least two different subnet segments of the computer network.

Figure 4:
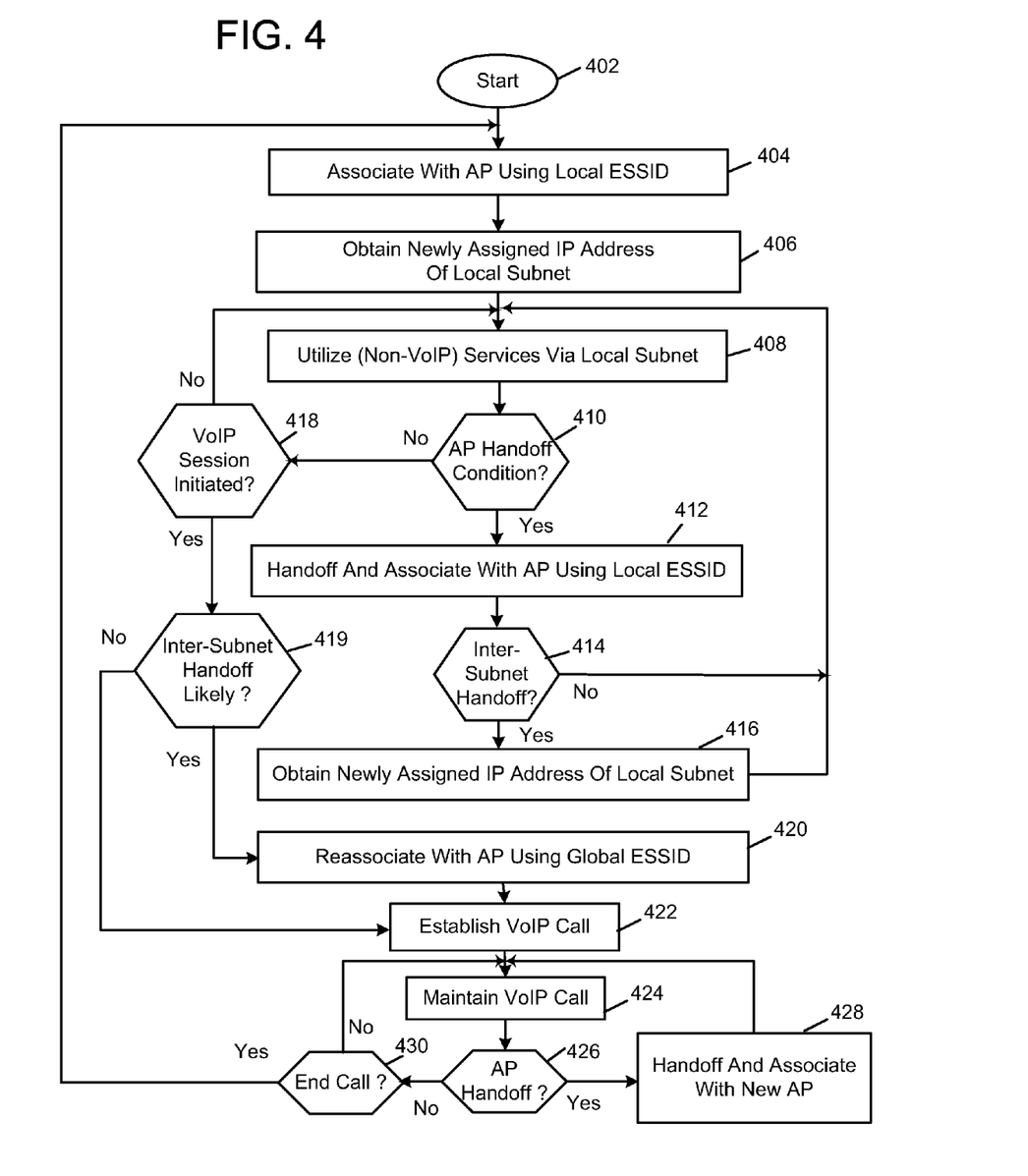
FIG. 4 is a flowchart for describing a method for use in facilitating VoIP communication sessions for a mobile communication device in a computer network as described in relation to FIG. 3.

FIG. 4 is a flowchart of a method for use in operating a mobile communication device for voice communication sessions in a computer network having the global VLAN. This method may be employed in the computer network 300 of FIG. 3. The method of FIG. 4 involves steps which may be performed by the mobile device and/or network/WLAN components. At least some of the steps of the method may be embodied in a computer program product which includes a computer readable medium (e.g. memory) and computer instructions stored in the computer readable medium which are executable by one or more processors.

Beginning at a start block 402 of FIG. 4, the mobile device enters and establishes communication in the WLAN for communication services. Conventional or other suitable setup techniques are utilized to establish such communication via the WLAN. For one, the mobile device associates with a wireless AP of a (first) subnet segment using a local ESSID (step 404 of FIG. 4). An IP address of the (first) subnet segment is also assigned to and received by the mobile device, so that the mobile device may be able to receive and send IP data packet communications (step 406 of FIG. 4). Once these setup techniques have been completed, the mobile device accesses and utilizes services of the network through the wireless AP of the WLAN (step 408 of FIG. 4).

During operation in the WLAN, the mobile device may be moved from the RF coverage area of the wireless AP with which it is currently associated to the RF coverage area of another new wireless AP. If the mobile device identifies such an AP handoff condition (step 410 of FIG. 4), then the mobile device will handoff and associate with the other new wireless AP using a local ESSID (step 412 of FIG. 4). Depending on the network configuration, the local ESSID utilized in step 412 may be the same local ESSID as that previously utilized in step 404 or a different ESSID. If the handoff is an inter-subnet handoff (step 414 of FIG. 4), a new IP address of the new (second) subnet segment is assigned to and received by the mobile device (step 416 of FIG. 4); otherwise no IP address reassignment is needed. Once these setup techniques for the new wireless AP have been completed, the mobile device may continue to access and utilize services via the new wireless AP as indicated in step 408.

If there is no AP handoff condition in step 410 of FIG. 4, then the mobile device identifies whether a voice communication session is imminent (step 418 of FIG. 4). The voice communication session, which may be a VoIP session, may be initiated by the mobile device or by an outside calling party through the WLAN. If no voice communication session is imminent in step 418, then the mobile device continues to access and utilize other services in step 408. If a voice communication session is imminent as identified in step 418, then the mobile device may identify whether any indication exists for the likelihood of an inter-subnet handoff (as described earlier in relation to FIG. 3) (step 419 of FIG. 4). If yes in step 419, then the mobile device reassociates with the wireless AP with use of a global ESSID of the global VLAN (step 420 of FIG. 4). Otherwise, no reassociation with a different ESSID occurs. Thereafter, the voice communication session involving the mobile device is established (step 422 of FIG. 4) and maintained (step 424 of FIG. 4) in the WLAN.

During the voice communication session, the mobile device may be moved from the RF coverage area of the wireless AP with which it is currently associated to the RF coverage area of another new wireless AP. If the mobile device identifies an AP handoff condition (step 426 of FIG. 4), then the mobile device will handoff and associate with the other new wireless AP (step 428 of FIG. 4) and continue maintaining the voice communication session at step 424 of FIG. 4. If the local ESSID was utilized upon establishment of the voice communication session, a local ESSID will be used by the mobile device to associate with the new wireless AP in step 428. If the global ESSID was utilized upon establishment of the voice communication, then the mobile device will use the global ESSID of the global VLAN regardless of which subnet segment the new wireless AP is connected within. As the global VLAN spans the entire computer network, no IP address reassignments during inter-subnet handoffs are needed when the global ESSID is utilized for voice communication sessions.

If the mobile device identifies an indication that the voice communication session is ending (step 430 of FIG. 4), then the call is terminated through call termination procedures; otherwise the voice communication session is maintained at step 424 of FIG. 4. In step 430, the end user of the mobile device may cause the termination of the voice communication session through the user interface of the mobile device. On the other hand, the other calling party may cause the termination of the voice communication session in step 430. If the voice communication session is ended in step 430, then the mobile device reassociates with the wireless AP using the local ESSID back at step 404. The flowchart description of FIG. 4 is complete.

Again, the specific procedures may vary depending on whether the VoIP session or call is initiated by mobile device 202 (i.e. an outgoing call from mobile device 202) or from a calling terminal (i.e. an incoming call to mobile device 202). When the VoIP session is initiated by mobile device 202, mobile device 202 detects a call request being made through its user interface. The detection of the call request causes mobile device 202 to automatically switch over to the global VLAN (assuming the proper conditions are met) and be assigned with a new IP address from DHCP server 394. Prior to initiating the procedures to establish the VoIP session, mobile device 202 sends the newly-assigned IP address to VoIP/SIP server 348 for use during communications for the VoIP session. For an incoming call, VoIP/SIP server 348 which serves as a proxy will receive an INVITE message from the calling terminal on behalf of mobile device 202 and forward the message to mobile device 202. Mobile device 202 receives and detects this message and, in response, automatically switches over to the global VLAN and receives the newly-assigned IP address from DHCP server 394. Subsequently, mobile device 202 sends a REINVITE message to VoIP/SIP server 348 along with the newly-assigned IP address. The call is subsequently answered for the VoIP session to commence with the newly-assigned IP address being used for communications.

Again, although it has been described that the computer network employs a single global VLAN, the computer network may in practice employ multiple VLANs for such purposes depending on the network requirements, where each separate VLAN is associated with at least two different subnet segments of the computer network.

Thus, as described herein, a computer network which includes a wireless local area network (WLAN) has at least first and second subnet segments and a router coupled between the first and the second subnet segments. The first subnet segment has a first IP subnet address range and the second subnet segment has a second IP subnet address range different from the first IP subnet address range. At least a first wireless access point of the WLAN in the first subnet segment has both a local extended service set identifier (ESSID) and a global ESSID for mobile communication devices to associate with it. Similarly, at least a second wireless access point of the WLAN in the second subnet segment has both a local ESSID and the global ESSID for mobile communication devices to associate with it. The local ESSIDs of the first and the second wireless access points may be the same or different ESSIDs. The global ESSID is used for accessing a global virtual local area network (VLAN) which spans the entire network including the first and the second subnet segments. Initially, a mobile communication device associates with the first wireless access point using the local ESSID. Just prior to the establishment of a Voice over IP (VoIP) session or call, however, the mobile device reassociates with the first wireless access point using the global ESSID of the global VLAN. Thus, the VoIP session is established and maintained for the mobile device in the global VLAN. If a handoff to the second wireless access point in the second subnet segment is made during the VoIP session, the mobile device associates with the second wireless access point also using the global ESSID of the global VLAN. After termination of the VoIP session, the mobile device associates with the first or the second wireless access point using the local ESSID. Advantageously, no IP address reassignments for inter-subnet handoffs are needed during VoIP sessions, which improves the timeliness and reliability of such handoffs.

A mobile communication device of the present disclosure is adapted to operate in a computer network which includes a wireless local area network (WLAN). The computer network further includes at least first and second subnet segments and a router coupled between the first and the second subnet segments. The first subnet segment has a first IP subnet address range and the second subnet segment has a second IP subnet address range different from the first IP subnet address range. At least a first wireless access point in the first subnet segment has a local extended service set identifier (ESSID) and a global ESSID for mobile communication devices to associate with it, and at least a second wireless access point in the second subnet segment has a local ESSID and the global ESSID for mobile communication devices to associate with it. The global ESSID is used for accessing a global virtual local area network (VLAN) of the computer network which spans the entire network including the first and the second subnet segments. The mobile communication device includes one or more processors; a wireless transceiver coupled to the one or more processors; and an antenna circuit coupled to the wireless transceiver. The one or more processors of the mobile communication device are operative to cause an association to be made with the first wireless access point, with use of the wireless transceiver, using the local ESSID and, prior to the establishment of a Voice over IP (VoIP) communication session in the WLAN: cause an association to be made with the first wireless access point, with use of the wireless transceiver, using the global ESSID of the global VLAN; maintain the VoIP communication session in the global VLAN with use of the wireless transceiver; and cause an association to be made with the second wireless access point, with use of the wireless transceiver, using the global ESSID of the global VLAN if a handoff to the second wireless access point of the second subnet segment is made during the VoIP communication session.

The above-described embodiments of the present disclosure are intended to be examples only. Those of skill in the art may effect alterations, modifications and variations to the particular embodiments without departing from the scope of the application. For example, the WLANs may be based on WiMAX technology or other suitable wireless technologies. The invention described herein in the recited claims intends to cover and embrace all suitable changes in technology.

What is claimed is:

1. A method for facilitating communication sessions for a mobile communication device in a communication network, the communication network having a first wireless access point in a first subnet segment and a second wireless access point in a second subnet segment, the method comprising:
   associating with the first wireless access point using a first extended set service identifier (ESSID);
   in response to identifying a request to establish a communication session involving the mobile communication device:
      reassociating with the first wireless access point using a second ESSID which is different from the first ESSID;
      establishing and maintaining the communication session for the mobile communication device while being associated with the first wireless access point using the second ESSID; and
      in a handoff to the second wireless access point during the communication session, associating with the second wireless access point using the second ESSID.

2. The method of claim 1, wherein the communication network has a virtual local area network (VLAN) which spans the first and the second subnet segments, the method further comprising:
   accessing the VLAN to establish and maintain the communication session.

3. The method of claim 1, further comprising:
   after terminating the communication session, reassociating with an access point of the communication network using the first ESSID.

4. The method of claim 1, wherein the first subnet segment has a first IP subnet address range and the second subnet segment has a second IP subnet address range different from the first IP subnet address range.

5. The method of claim 1, wherein the communication session comprises a voice communication session.

6. The method of claim 1, wherein the communication network comprises a wireless local area network (WLAN).

7. The method of claim 1, wherein the communication network has a virtual local area network (VLAN) which spans the first and the second subnet segments, the method further comprising:
   prior to the communication session being established, receiving an assignment of an IP address of the first subnet segment;

after reassociating with the first wireless access point using the second ESSID, accessing the VLAN; and
receiving an assignment of a new IP address in the global VLAN.

8. A computer program product, comprising:
a non-transitory computer readable medium;
computer instructions stored in the non-transitory computer readable medium;
the computer instructions being executable by one or more processors of a mobile communication device for facilitating communication sessions for a mobile communication device in a communication network, the communication network having a first wireless access point in a first subnet segment and a second wireless access point in a second subnet segment, the computer instructions being further executable for:
associating with the first wireless access point using a first extended set service identifier (ESSID);
in response to identifying a request to establish a communication session involving the mobile communication device:
reassociating with the first wireless access point using a second ESSID which is different from the first ESSID;
establishing and maintaining the communication session for the mobile communication device while being associated with the first wireless access point using the second ESSID; and
in a handoff to the second wireless access point during the communication session, associating with the second wireless access point using the second ESSID.

9. The computer program product of claim 8, wherein the communication network has a virtual local area network (VLAN) which spans the first and the second subnet segments, the computer instructions being further executable for:
for the communication session, accessing the VLAN using the second ESSID.

10. The computer program product of claim 8, wherein the computer instructions are further executable for:
after terminating the communication session, reassociating with an access point of the communication network using the first ESSID.

11. A mobile communication device configured to communicate in a wireless network which is part of a communication network, the communication network having a first wireless access point in a first subnet segment and a second wireless access point in a second subnet segment, the mobile communication device comprising:
one or more processors;
a wireless transceiver coupled to the one or more processors;
the one or more processors being operative to:
associate with the first wireless access point via the wireless transceiver using a first extended set service identifier (ESSID);
identify a request to establish a communication session involving the mobile communication device;
in response to the identifying:
reassociate with the first wireless access point via the wireless transceiver using a second ESSID which is different from the first ESSID;
establish and maintain the communication session via the wireless transceiver while being associated with the first wireless access point using the second ESSID; and
in a handoff to the second wireless access point during the communication session, associate with the second wireless access point via the wireless transceiver using the second ESSID.

12. The mobile communication device of claim 11, wherein the communication network has a virtual local area network (VLAN) which spans the first and the second subnet segments, the one or more processors being further operative to:
for the communication session, access the VLAN using the second ESSID.

13. The mobile communication device of claim 11, wherein the one or more processors are further operative to:
after terminating the communication session, reassociate with an access point of the communication network via the wireless transceiver using the first ESSID.

14. The mobile communication device of claim 11, wherein the first subnet segment has a first IP subnet address range and the second subnet segment has a second IP subnet address range different from the first IP subnet address range.

15. The mobile communication device of claim 11, wherein the communication session comprises a voice communication session.

16. The mobile communication device of claim 11, wherein the wireless network comprises a wireless local area network (WLAN).

17. The mobile communication device of claim 11, wherein the one or more processors are further operative to:
prior to the communication session being established, receive an assignment of an IP address of the first subnet segment; and
after reassociating with the second wireless access point, receive an assignment of a new IP address.

* * * * *